Patented July 8, 1924.

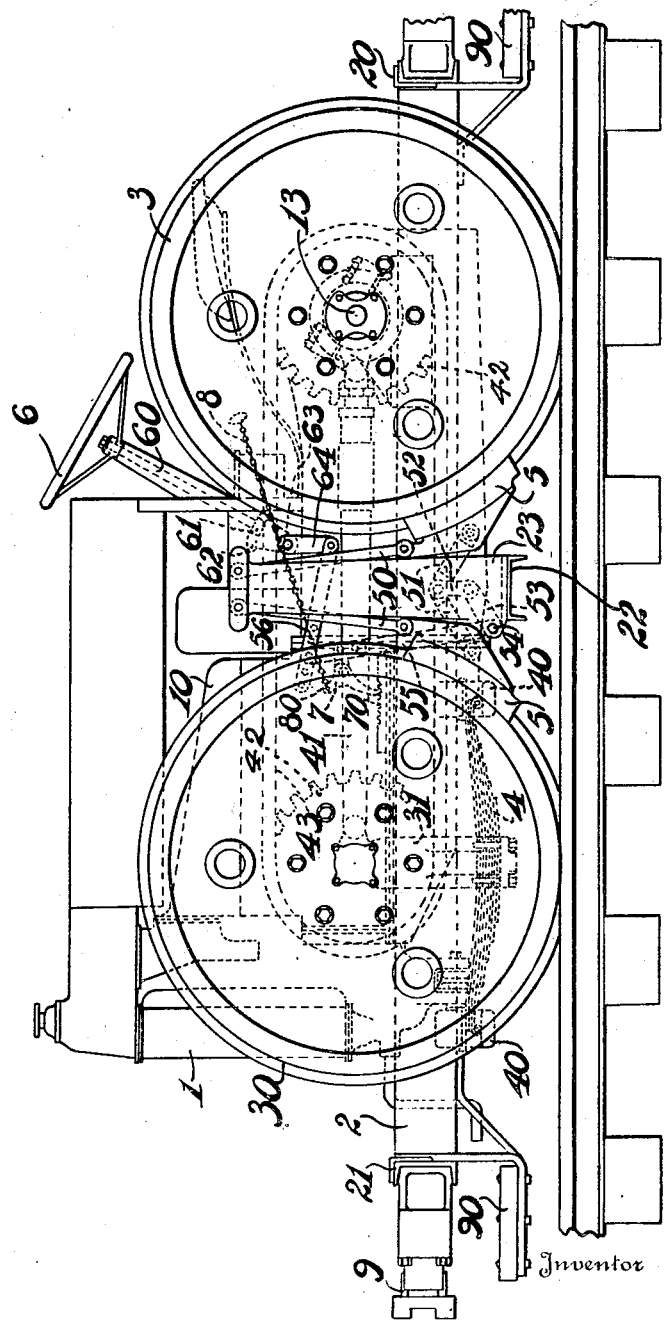

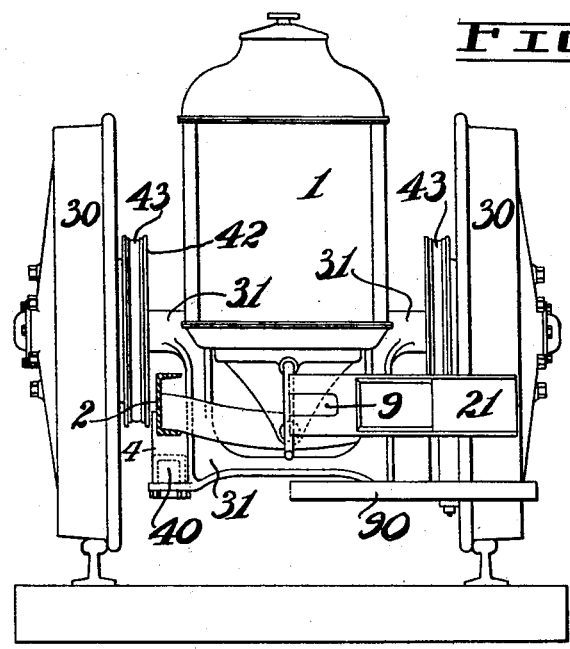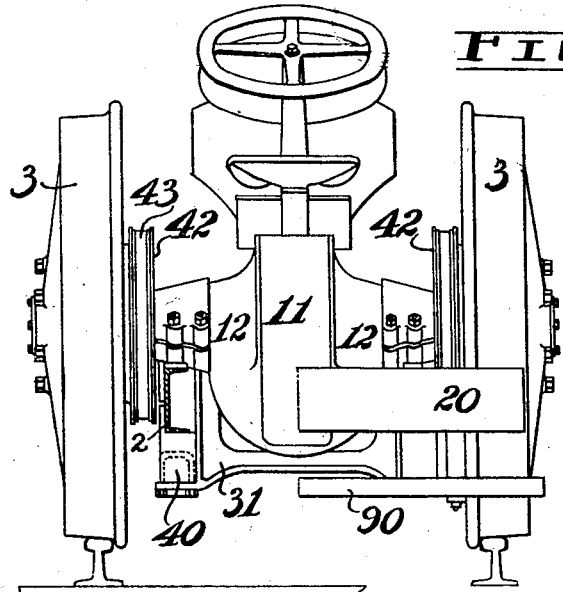

1,500,330

UNITED STATES PATENT OFFICE.

SYDNEY S. McINTYRE, OF SEDRO WOOLLEY, WASHINGTON.

LOCOMOTIVE.

Application filed October 27, 1921. Serial No. 510,715.

*To all whom it may concern:*

Be it known that I, SYDNEY S. MCINTYRE, a citizen of the United States of America, and resident of the city of Sedro Woolley, in Skagit County, State of Washington, have invented certain new and useful Improvements in Locomotives, of which the following is a specification.

My invention relates to locomotives in which the power plant and transmission mechanism of a tractor or automotive vehicle is mounted upon a special frame with special wheels to form a locomotive adapted for running upon rails.

The object of my invention is to provide a locomotive of relatively small size and power adapted particularly for such use as operation upon tramways for mines, plantations, factories, and logging and milling operations, which will be cheap to manufacture, reliable in its use and of a type of construction which is understood and which may be operated by the great majority of people.

One of the objects of my invention is to produce such a locomotive by the use, to as full an extent as possible and with the minimum of change, of the power plant and transmission mechanism of a widely distributed and well-known type of tractor.

The features of my invention which I believe to be new and upon which I desire to obtain a patent will be hereinafter described and then particularly defined in the claims.

In the accompanying drawings I have shown my invention constructed in accordance with the principles above stated.

Figure 1 is a side elevation of a locomotive constructed in accordance with my invention.

Figure 2 is a front elevation of such a locomotive with a portion of the frame cut away at one side of the center line.

Figure 3 is a similar rear elevation with a portion of the frame cut away at one side of the center line.

In constructing a locomotive in accordance with my invention, I employ the power plant and the transmission mechanism of a well-known type of tractor without any alterations, transferring the same to a special frame and providing special wheels adapted to run upon a track and means for connecting these wheels with the power and transmission mechanisms.

In the drawings 1 indicates the radiator of the power plant, 10 the outline of the casing which contains the engine, 11 the differential which is a part of the driving axle mechanism, 12 the rear axle casing, and 13 the rear axle. This rear axle is of standard type of construction, consisting of two parts connected by a differential. It is in no way altered from what it was in the tractor. The mechanism for shifting the gears and changing the speed ratio are contained within the casing of the usual tractor. All of these parts may be of any standard type of construction. I employ these parts of the tractor as commercially sold and apply them without change, in the locomotive.

I employ a special frame or chassis for the above parts, the same as illustrated employing two side bars 2, transverse end bars 20 and 21 and such other transverse connecting bars as may be desired, as, for instance, the cross bar 22 upon which uprights or posts 23 are mounted at each side of the engine for the suitable support of brake shoes.

Upon each end of the driving axle 13 is secured a traction or track wheel 3. Similar wheels 30 are provided one at each side of the locomotive and arranged forwardly of the wheels 3. These are journaled independently upon axles carried by the frame 2. As illustrated these are mounted to turn upon the ends of an axle 31 which is of U-shape in its central portion, passing beneath the side bars 2 of the main frame. This axle is connected with the main frame by means of a spring, as 4, at each side of the locomotive, which spring at its central portion is secured to the axle and has its ends entering within and carried by clips or socket pieces 40 which are secured to the side bars of the frame. These wheels are thus secured to the main frame through the intervention of springs, thus giving a yielding support to the front end of the frame.

Thrust rods as 41 connect the front and rear axles. Sprocket gears, as 42, secured to the sides of the traction wheels 3 and 30 are connected by sprocket chains, as 43, whereby the front wheels 30 are driven from the rear wheels 3. By reason of using the differential in connection with the rear axle and then driving the front wheels from the rear wheels, the differential effect is secured for the front wheels as well as for the rear wheels.

Brake shoes 5 are applied to each of the track or traction wheels. These brake shoes are placed in engagement with adjacent edges of the two wheels of each side. They are supported by links 50 which are pivotally connected with the upper ends of the brake shoes and are pivoted by their upper ends to the upper ends of the posts 23 which latter are secured to the frame. The two brake shoes of a pair at each side of the engine are connected by links 51 which form a toggle. This latter is connected by a link 52 to a crank arm 53 secured to a rock shaft 54. This rock shaft has secured thereto an operating lever 55 which at its upper end has secured to it a link 56.

In transferring the tractor mechanism to the locomotive the steering wheel 6 with its post 60 and the mechanism for swinging the wheels in turning, have been retained. In the type of tractor illustrated in the drawings this mechanism employs a bevel pinion 61 mounted upon the steering wheel shaft, a segment gear 62 secured to a rock shaft 63, and an arm 64 secured to said shaft. This arm 64 or its equivalent arm of any other type of steering mechanism, is connected with the link 56. What was the steering mechanism of the tractor is thus in large part utilized for the operation of the brakes.

To retain the brakes in set position I have provided a ratchet dog 7 pivotally supported from the lever 55 and adapted to engage a rack 70 which is secured upon or carried from the frame of the engine. This will serve to hold the brake in any position at which it is set. To release the dog any suitable mechanism may be employed. I have shown a chain, as 8, which is secured to an arm, as 80, connected with the dog, said chain leading to a convenient point where it may be engaged by the operator to free the pawl.

At each end of the locomotive I provide a draw bar and coupling device as 9. This may be of any suitable construction. I have also shown a foot board or step as 90 at each end for convenience of switchmen and others who may desire or need to ride upon the engine.

An engine constructed after this plan requires the special manufacture of but a small part thereof, as the entire power plant and transmission mechanism of a standard tractor may be employed. This makes it possible to secure the repair parts which are most liable to be needed, as well as the experience required in operating and caring for the engine, at any place and quickly. Such an engine may be quickly assembled and is adapted for a wide range of uses. As two of the wheels are connected with the frame through the intervention of springs, the locomotive becomes flexible and capable of running over uneven and rough track. As the wheel base is kept short it is capable of successfully operating over tracks with sharp curves.

What I claim as my invention is:

1. A track locomotive comprising a frame, a pair of traction wheels at each side, brake shoes engaging adjacent edges of said wheels, means for holding said brake shoes against vertical movement relative to the frame, a brake operating mechanism comprising a steering wheel, post and rock arm of a tractor and operative mechanism connecting said rock arm with the brake shoes.

2. A locomotive comprising a self-contained internal combustion power plant of the tractor type, a pair of traction wheels mounted upon the tractor driving axle, a locomotive frame upon which said power plant is mounted, a second axle mounted upon said frame, traction wheels upon said second axle, a beam secured to said frame and extending crosswise thereof between the two sets of wheels, a brake mechanism mounted upon said cross beam and acting directly upon the wheel treads, and means for operating said brake comprising an actuating hand wheel which originally constituted the tractor steering wheel.

3. A locomotive comprising a self-contained power plant of the tractor type, a frame upon which said power plant is mounted, an axle driven directly by said power plant, tractor wheels secured on said axle, a second axle mounted upon said frame, tractor wheels journaled upon said second axle, driving means connecting the two wheels of each side, a cross beam secured to the frame and located between the two sets of wheels, a standard carried upon each end of the cross beam and extending upwardly between the wheels, brake shoes engaging the adjacent faces of said wheels, links suspending said brake shoes from said standards, and means for applying said brake shoes comprising a wheel which is the steering wheel of the original tractor.

Signed at Sedro Woolley, Skagit County, Washington this 21st day of October 1921.

SYDNEY S. McINTYRE.